Patented June 21, 1932

1,864,078

UNITED STATES PATENT OFFICE

MARTIN LUTHER, OF MANNHEIM, AND CLAUS HEUCK, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTS OF LATEX CHARACTER AND A PROCESS FOR PRODUCING THE SAME

No Drawing. Application filed January 4, 1928, Serial No. 244,550, and in Germany January 8, 1927.

The present invention relates to improved products of latex character and a process for the production of the same by polymerization of emulsions of diolefines.

We have found that diolefines such as butadiene and its homologues and analogues are advantageously converted into products of latex character by emulsifying these initial materials in aqueous media with emulsifying agents having a soap-like character such as sulfonic acids which expression is also intended to include the salts thereof, oleates and the like and polymerizing the emulsified products. It is usually preferable to conduct the polymerization in the presence of buffer systems with a fixed hydrogen-ion concentration, because the polymerization is thereby accelerated, and premature coagulation of the emulsion is prevented. A sutiable hydrogen-ion concentration for this operation is between pH=4 and 8.5 such as is obtained, for example, by the addition of acetic acid and sodium acetate or of secondary and tertiary sodium phosphate. The polymerization may be effected not only by heat treatment but also by the exposure to light of short wave-length, and also by the action of special polymerizing agents such as acrylic esters, condensation products of acrolein, alkylamines, arylamines and the like or by the simultaneous employment of several methods of polymerization.

The resulting products may be worked up, in the same way as latex, into rubber products in any known or suitable manner as for example by coagulation, rolling, vulcanizing and the like.

The following examples will further illustrate the nature of the said invention which however is not limited thereto. The parts are by weight.

Example 1

100 parts of isoprene are emulsified in 400 parts of water, with the addition of 10 parts of ammonium oleate, 3 parts of tertiary sodium phosphate and 2 parts of secondary sodium phosphate, for example in a so called turbo mixer or apparatus with a similar action, and are then warmed at from 60 to 80 degrees centigrade in a pressure apparatus for 3 weeks. At the end of that period, the greater part of the isoprene will have been polymerized, and a product of latex character formed. The rubber is now coagulated from this artificial latex by the addition of acids, such as acetic acid, hydrochloric acid and the like or also by the addition of acid buffer systems with a hydrogen-ion concentration of pH about 3 to 4. The resulting artificial rubber can be further treated by rolling, drying, vulcanizing and other like means.

Example 2

200 parts of isoprene are emulsified in 800 parts of water, with the addition of 5 parts of sodium oleate, 10 parts of the sodium salt of an isobutylated naphthalene-sulfonic acid, 10 parts of glue and 2 parts of secondary sodium phosphate, and maintained at from 80 to 90 degrees centigrade in a pressure vessel for 14 days. An artificial latex is obtained from which the artificial rubber can be recovered by the further treatment described in Example 1.

Example 3

A mixture of 100 parts of isoprene and 75 parts of butadiene is emulsified in 500 parts of water, with the addition of 15 parts of Turkey-red oil and 15 parts of tertiary sodium phosphate. The emulsion is then treated in the same manner as in Example 2, and furnishes an excellent and really vulcanizable product of latex character.

What we claim is:

1. The process for the production of stable substances of latex character, which comprises emulsifying diolefines in aqueous media with emulsifying agents having a soap-like character, and polymerizing the emulsified materials in the presence of buffer systems.

2. The process for the production of stable substances of latex character, which comprises emulsifying diolefines in aqueous media with emulsifying agents having a soap-like character, and polymerizing the emulsified materials in the presence of buffer systems maintaining a hydrogen-ion concentration of pH between 4 and 8.5.

3. The process for the production of stable substances of latex character, which comprises emulsifying diolefines in aqueous media with sulfonic acids and polymerizing the emulsified materials by heating.

4. The process for the production of stable substances of latex character, which comprises emulsifying a mixture of butadiene and isoprene in water with Turkey-red oil and polymerizing the emulsified product by heating to between 80° and 90° C. under pressure in the presence of tertiary sodium phosphate acting as a buffer system.

5. As a new article of manufacture, a stable product of latex character comprising water, Turkey-red oil, tertiary sodium phosphate, and a polymerized mixture of butadiene and isoprene emulsified therein.

6. As a new article of manufacture, a stable product of latex character comprising water, an emulsifying agent having a soap-like character, a buffer system and a polymerized diolefine emulsified therein.

7. As a new article of manufacture, a product of latex character comprising water, a sulphonic acid and a polymerized diolefine emulsified in the water.

In testimony whereof we have hereunto set our hands.

MARTIN LUTHER.
CLAUS HEUCK.